(12) United States Patent
Machani

(10) Patent No.: US 9,935,947 B1
(45) Date of Patent: Apr. 3, 2018

(54) SECURE AND RELIABLE PROTECTION AND MATCHING OF BIOMETRIC TEMPLATES ACROSS MULTIPLE DEVICES USING SECRET SHARING

(71) Applicant: EMC Corporation, Hopkinton, MA (US)

(72) Inventor: Salah Machani, Toronto (CA)

(73) Assignee: EMC IP Holding Company LLC, Hopkinton, MA (US)

( * ) Notice: Subject to any disclaimer, the term of this patent is extended or adjusted under 35 U.S.C. 154(b) by 195 days.

(21) Appl. No.: 14/974,462

(22) Filed: Dec. 18, 2015

(51) Int. Cl.
| | |
|---|---|
| G06F 7/04 | (2006.01) |
| H04L 9/32 | (2006.01) |
| G06F 21/00 | (2013.01) |
| G06K 9/00 | (2006.01) |
| H04L 29/06 | (2006.01) |
| H04L 29/08 | (2006.01) |

(52) U.S. Cl.
CPC ...... *H04L 63/0861* (2013.01); *H04L 67/1002* (2013.01)

(58) Field of Classification Search
CPC .......... H04L 63/0861; H04L 67/1002
USPC ........... 726/4–6; 713/168, 186; 382/115, 116
See application file for complete search history.

(56) References Cited

U.S. PATENT DOCUMENTS

| | | | | |
|---|---|---|---|---|
| 6,182,214 B1 * | 1/2001 | Hardjono | ............... | H04L 9/085 380/255 |
| 6,526,161 B1 | 2/2003 | Yan | | |
| 2007/0255963 A1 * | 11/2007 | Pizano | ............... | G06F 21/32 713/189 |
| 2008/0019573 A1 * | 1/2008 | Baltatu | ............... | G06F 21/32 382/115 |
| 2013/0152221 A1 * | 6/2013 | Yin | ............... | G06F 21/10 726/31 |
| 2014/0006806 A1 * | 1/2014 | Corella | ............... | G06F 21/6218 713/193 |

(Continued)

OTHER PUBLICATIONS

Nagar et al. "Biometric Template Transformation: A Security Analysis", Media Forensics and Security II, Proc. SPIE 7541, (75410O) Jan. 28, 2010, 15 pages.

(Continued)

*Primary Examiner* — Aravind K Moorthy
(74) *Attorney, Agent, or Firm* — BainwoodHuang

(57) ABSTRACT

Biometric information from an initial sample is used to generate a biometric template for a user. The biometric template is split into multiple template shares using a polynomial secret sharing scheme, such that at least some threshold number of the resulting template shares must be combined to reconstruct the biometric template. After the biometric template is split, the resulting template shares are distributed to multiple components in the system, such as a server, and/or one or more user devices, and the original copy of the biometric template is destroyed. To subsequently verify the identity of the user, the threshold number of template shares are obtained and combined to reconstruct the user's biometric template, and the reconstructed template is compared with biometric information extracted from one or more subsequently collected biometric samples. If there is a match between the reconstructed biometric template and the extracted biometric information, the user's identity is verified.

19 Claims, 8 Drawing Sheets

(56) References Cited

U.S. PATENT DOCUMENTS

| | | | | |
|---|---|---|---|---|
| 2014/0089683 A1* | 3/2014 | Miller | ................... | H04L 63/061 |
| | | | | 713/193 |
| 2016/0087797 A1* | 3/2016 | Barbir | ................... | H04L 9/3226 |
| | | | | 713/171 |
| 2017/0134375 A1* | 5/2017 | Wagner | ............... | H04L 63/0861 |

OTHER PUBLICATIONS

Riha et al. "Biometric Authentication Systems", Faculty of Informatics, Masaryk University, FIMU Report Series (FIMU-RS-2000-08), Nov. 2000, 46 pages.
Shamir, Adi, "How to Share a Secret", Communications of the ACM, Massachusetts Institute of Technology, (vol. 22, No. 11) Nov. 1979, 2 pages.
Wayman, et al. "An Introduction to Biometric Authentication Systems", Biometric Systems, Technology, Design and Performance Evaluation (XIV), 2005, 21 pages.

* cited by examiner

SECURE AND RELIABLE PROTECTION AND MATCHING OF BIOMETRIC TEMPLATES ACROSS MULTIPLE DEVICES USING SECRET SHARING

BACKGROUND

Biometric templates are used in biometric systems to identify a person and/or to verify a claimed identify of a person. A biometric template that identifies a given individual is a digital representation of one or more distinct physiological and/or behavioral characteristics of that person, based on biometric information extracted from one or more biometric samples. The biometric samples from which biometric information is extracted to form a biometric template may, for example, include biometric data such as a facial image of the individual, a recording of the individual's voice, an image of a fingerprint of the individual, and/or various other specific biometric identifiers.

The initial biometric sample or samples used to create an individual's biometric template may be captured the first time an individual uses the biometric system, and used as inputs to a process referred to as "enrollment" that generates an "enrolled template" for the individual. In subsequent, non-enrollment uses, the biometric system compares biometric information from one or more subsequently collected samples with biometric information stored in one or more of the enrolled templates. For example, a biometric system may operate to identify an individual by comparing biometric information from a subsequently collected biometric sample to some or all of the enrolled templates stored in a database of enrolled templates. In another example, the biometric system may verify a claimed identity of an individual, by comparing biometric information from a subsequently collected biometric sample to one or more enrolled templates associated with the claimed identity.

SUMMARY

Previous biometric systems have exhibited significant shortcomings with regard to securely protecting the biometric templates they generate and use. Previous biometric systems have stored biometric templates in a central database, or in smartcards or other end user computing devices, and have often attempted to protect the stored biometric templates using encryption. When the biometric templates are needed to perform a comparison with subsequently captured biometric information, they must be decrypted, since the "fuzzy" matching needed for effective comparison of biometrics can only be performed using plaintext versions of the biometric templates. Some previous approaches to encrypting the stored biometric templates have used a software-based encryption approach to protecting biometric templates. Unfortunately, the software-based encryption approach to protecting biometric templates introduces an additional vulnerability flowing from the need to store and protect one or more cryptographic keys in the biometric system, resulting in complex protocols and access controls. To address this additional vulnerability, some biometric systems have used hardware-based or hardware-assisted security modules, such as smartcards, embedded Security Elements (SEs) or Trusted Execution Environments (TEEs) to protect biometric templates. In these previous systems, the cryptographic key used to encrypt the biometric template is generated in hardware or fused in hardware during manufacturing. The biometric data is then stored and processed inside the secure enclave of the SE or the TEE, and never leaves the boundaries of the secure enclave.

Another technique used by previous biometric systems to protect biometric templates is the "BioHashing" technique. In BioHashing, instead of generating and storing biometric templates made up of biometric data or minutiae, the biometric data is transformed by putting it through a cryptographic hash function (such as SHA-256), and optionally using additional information derived from a user specific password or a cryptographic key (also known in cryptography as "salting"), to generate renewable anonymous templates that can be stored in a database.

While the hardware-based and BioHashing approaches may provide better security and protection for the template than a software-based encryption approach, they each have significant drawbacks. For example, BioHashing has been shown to be vulnerable to intrusion and linkage attacks because it may be relatively easy to obtain a close approximation of an original template. Also, when the BioHashing transformation result (or "BioHash value"), is stored in a user's computing device, it can only be used on that device for matching. As a consequence, if the device is lost, the user must re-enroll on the replacement device. Further, the user must re-enroll for each additional device they want to use. In addition, as with password based authentication systems, if the BioHash value is stored in a central database in the cloud, a security breach may result in significant damages to the business entity hosting the biometric data.

With regard to the hardware-based approach, drawbacks include the fact that the hardware security modules used to protect the biometric templates are limited in availability and expensive. Also, because the encrypted biometric template is stored only on the hardware security module, matching can only be performed locally using that device. A user is required to re-enroll for each additional device they want to use for accessing the protected resource. If the hardware security module is lost, the biometric template is also lost and that user must re-enroll using a new device. In addition, the security of the system depends on the strength of the access control method used to protect the security module, since the complete biometric template may be obtained if an unauthorized access occurs.

To address these and other shortcomings of previous technologies, a new approach is disclosed herein for protecting a biometric template in a distributed biometric system. In the disclosed system, at least one initial biometric sample is captured from a user by a biometric sensor of a user device. Biometric information that describes at least one distinct physiological or behavioral characteristic of the user is then extracted from the initial sample, and used to generate a biometric template that identifies the user. The biometric template is then split into multiple template shares using a polynomial-based secret sharing scheme, such that at least a threshold number of the resulting template shares must be combined to reconstruct the biometric template. The threshold number of resulting template shares that must be combined to reconstruct the original biometric template is calculated as a value that is at least two. The splitting may further be performed such that the threshold number is calculated as a value that is less than the total number of resulting template shares.

After the original biometric template is split, the resulting template shares are individually distributed to multiple components in the system, and the original copy of the biometric template is destroyed.

The components in the system to which the template shares are distributed may include a server-side component and one or more user devices. One of the template shares is stored in a user device, e.g. in the user device at which the initial biometric sample was captured. Another one of the template shares may be transmitted to a remote server for storage on the remote server. Additional template shares may be transmitted to other user devices, e.g. such that each of the user's devices stores a different one of the template shares.

The disclosed system may split the biometric template such that the total number of resulting template shares is equal to the number of user devices associated with the user, incremented by one. The total number of user devices associated with the user may, for example, be calculated or otherwise determined in response to policy and/or configuration settings.

For example, the number of template shares generated during splitting of the biometric template may be calculated as a value one greater than the total number of user devices that belong to the user, or as a value one greater than the total number of user devices that the user is allowed to use with the biometric system.

The biometric template may be split such that any of the key shares may be combined to make up the threshold number of shares needed to reconstruct the biometric template. For example, when configuration settings indicate that identity verification must be performed even when the user device is not connected to the Internet, then the biometric template may be split such that any of the key shares may be combined to reconstruct the biometric template.

Alternatively, the biometric template may be split such that a particular one of the generated shares must be included in the combination of shares used to reconstruct the biometric template. For example, when configuration settings indicate that user identity verification is performed only when a user device is connected to the Internet, the biometric template may be split such that a particular one of the generated shares must be included in the combination of shares used to reconstruct the biometric template, and that one of the template shares is transmitted to and stored on the remote server.

To subsequently verify the identity of the user, the disclosed system obtains at least the threshold number of template shares required to reconstruct the original biometric template, combines the obtained template shares to reconstruct the original biometric template, and then compares the reconstructed template with biometric information extracted from one or more subsequently collected biometric samples. If there is a match between the reconstructed biometric template and the biometric information extracted from the subsequent biometric samples, the identity of the user from whom the subsequently collected biometric samples were captured is verified as being the same as the user identified by the original biometric template. The template shares obtained and used to reconstruct the user's biometric template may include the share stored in the local user device, and one or more other template shares that are obtained i) from the remote server, and/or ii) from one or more other user devices located in proximity to the user device on which the subsequently collected biometric samples were collected, e.g. one or more other user devices connected to same local area network as the user device at which the subsequently collected biometric samples were sampled.

Embodiments of the disclosed system may provide significant advantages over previous approaches. For example, the user's complete original biometric template, either encrypted or non-encrypted, is not stored at any single location. Since the disclosed system stores shares of the user's biometric template in different, distributed locations, knowledge of any one template share does not expose the complete original template. If there is a template share database security breach, or if an attacker steals the user's device, only one share of the biometric template is compromised. Also, the disclosed system does not require that the user re-enroll from each user device used by the user. As a result, the user need only enroll once using one user device, and can then subsequently verify their identity using multiple other devices without having to re-enroll. In addition, the disclosed system is flexible, in that biometrics matching can be performed locally on the user device or remotely on the server.

BRIEF DESCRIPTION OF THE DRAWINGS

The foregoing and other objects, features and advantages will be apparent from the following description of particular embodiments of the present disclosure, as illustrated in the accompanying drawings in which like reference characters refer to the same parts throughout the different views. The drawings are not necessarily to scale, emphasis instead being placed upon illustrating the principles of various embodiments of the present disclosure.

DETAILED DESCRIPTION

Embodiments of the invention will now be described. It is understood that such embodiments are provided by way of example to illustrate various features and principles of the invention, and that the invention is broader than the specific examples of embodiments disclosed herein.

Figure 1:
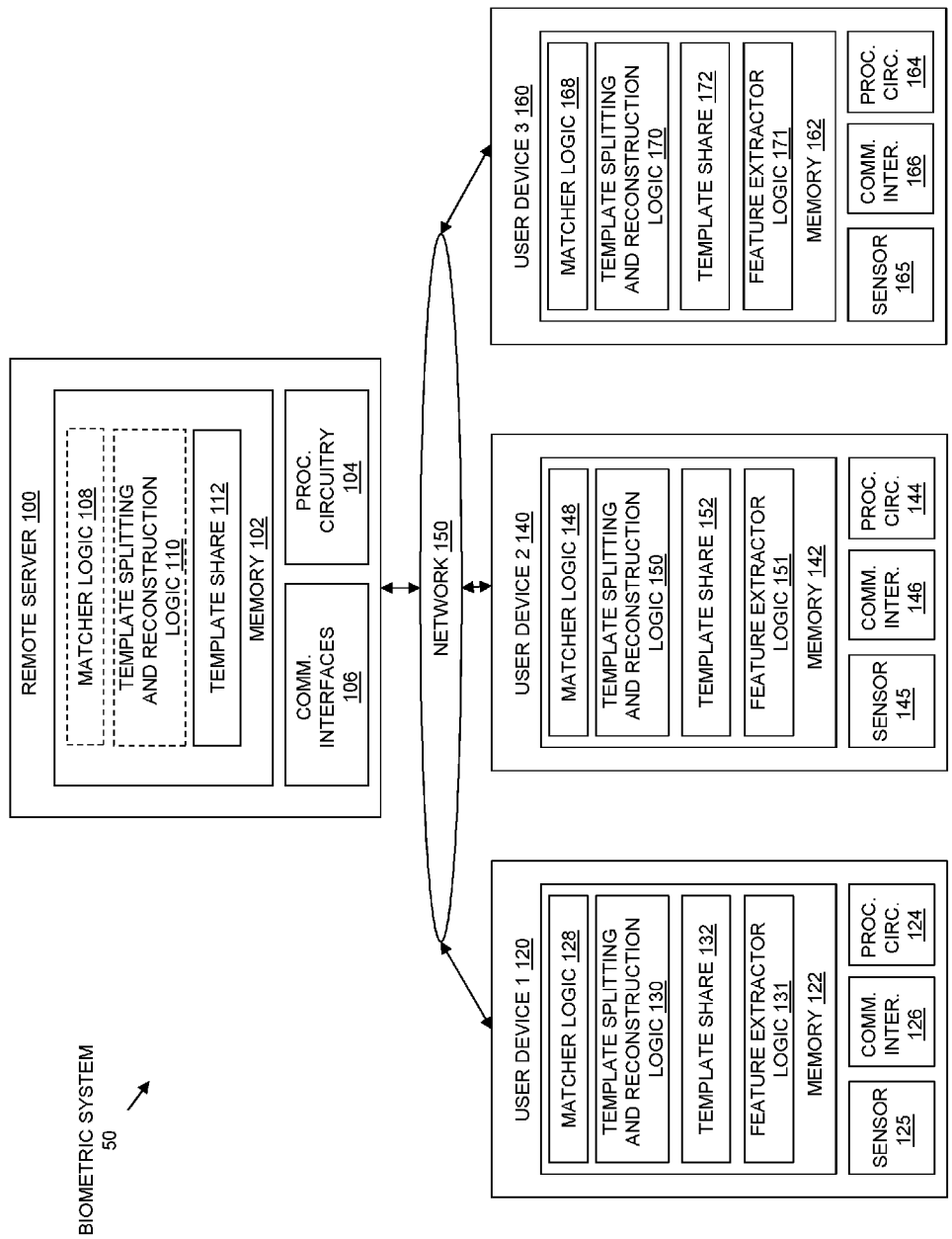
FIG. 1 is a block diagram showing devices in a distributed biometric system in which an embodiment of the disclosed system may operate.

FIG. 1 is a block diagram showing devices in a distributed biometric system in accordance with an embodiment of the disclosed system. As shown in the example of FIG. 1, a Biometric System 50 may include a server component, shown for purposes of illustration by Remote Server 100, and one or more user devices, shown for purposes of illustration by User Device 1 120, User Device 2 140 and User Device 3 160. In the example of FIG. 1, Remote Server 100, User Device 1 120, User Device 2 140 and User Device 3 160 are communicably interconnected through a Network 150. The Network 150 may, for example, include one or more communication networks of any specific type, such as the Internet, a WAN (Wide Area Network), a LAN (Local Area Network), and/or any other type of communication network. The user devices shown by User Device 1 120, User Device 2 140 and User Device 3 160 may each consist of or include any specific type of computerized user device, including but not limited to desktop computers, mobile devices such as laptop computers, tablet computers, smartphones, and/or personal digital assistants (PDAs), wearable devices such as smartwatches, activity trackers, etc., and/or Internet of Things (IoT) devices that are embedded with electronics, software, sensors, and network connectivity that enable the collection and exchange of data. The server component shown by Remote Server 100 may be embodied as one or more physical server computer systems, or alternatively as one or more virtual private servers (VPSs), such as a cloud server or the like.

In the example of FIG. 1, the Remote Server 100 is shown including a Memory 102, Processing Circuitry 104, and Communication Interfaces 106. The Communication Interfaces 106 may, for example, include one or more adapters and/or network interface adapters for converting electronic and/or optical signals received over a Network 150 into electronic form for use by Remote Server 100. The Processing Circuitry 104 may, for example, include or consist of one or more microprocessors, e.g. central processing units (CPUs), multi-core processors, chips, and/or assemblies. The Memory 102 may, for example, include or consist of any type of computer memory, such as volatile memory (e.g., RAM), or non-volatile memory (e.g. NVRAM), and/or semiconductor, magnetic or optical secondary computer storage (e.g. solid state, magnetic, or optical drives), and/or another computer readable medium, for storing program code executable on Processing Circuitry 104, and for storing data operated on by such program code. For example, program code executable on Remote Server 100 is shown optionally including Template Splitting and Reconstruction Logic 110 and Matcher Logic 108. A Template Share 112 may include or consist of a share of an original biometric template that was split according to polynomial-based secret sharing techniques. Template Share 112 may, for example, be stored within a secure template store made up of a database or the like containing multiple template shares, each of which is associated with a previously enrolled user of the biometric system 50. Those skilled in the art will recognize that while certain software constructs are specifically shown and described for purposes of explanation, the Memory 102 may additionally or alternatively include other software constructs, which are not shown, such as an operating system, various applications, and/or other processes.

Each of the user devices shown by User Device 1 120, User Device 2 140 and User Device 3 160 includes a memory (e.g. Memory 122 in User Device 1 120, Memory 142 in User Device 2 140, and Memory 162 in User Device 3 160), processing circuitry (e.g. Processing Circuitry 124 in User Device 1 120, Processing Circuitry 144 in User Device 2 140, and Processing Circuitry 164 in User Device 3 160), and communication interfaces (e.g. Communication Interfaces 126 in User Device 1 120, Communication Interfaces 146 in User Device 2 140, and Communication Interfaces 166 in User Device 3 160). The communication interfaces in each user device may, for example, include one or more adapters and/or network interface adapters for converting electronic and/or optical signals received over a Network 150 into electronic form for use by the respective user device. The processing circuitry in each user device may, for example, include or consist of one or more microprocessors, e.g. central processing units (CPUs), multi-core processors, chips, and/or assemblies. The memory in each user device may, for example, include or consist of any type of computer memory, such as volatile memory (e.g., RAM), or non-volatile memory (e.g. NVRAM), and/or semiconductor, magnetic or optical secondary computer storage (e.g. solid state, magnetic, or optical drives), and/or another computer readable medium, for storing program code executable on processing circuitry of the device, and for storing data operated on by such program code. For example, program code executable on each of the user devices shown in FIG. 1 includes feature extractor logic (e.g. Feature Extractor Logic 131 in User Device 1 120, Feature Extractor Logic 151 in User Device 2 140, and Feature Extractor Logic 171 in User Device 3 160), template splitting and reconstruction logic (e.g. Template Splitting and Reconstruction Logic 130 in User Device 1 120, Template Splitting and Reconstruction Logic 150 in User Device 2 140, and Template Splitting and Reconstruction Logic 170 in User Device 3 160), and matcher logic (e.g. Matcher Logic 128 in User Device 1 120, Matcher Logic 148 in User Device 2 140, and Matcher Logic 168 in User Device 3 160). Further in the example of FIG. 1, each of the user devices is shown storing at least one template share (e.g. Template Share 132 in User Device 1 120, Template Share 152 in User Device 2 140, and Template Share 172 in User Device 3 160). The template share(s) stored in each user device may include or consist of a share of an original biometric template that was split according to polynomial-based secret sharing techniques, and that is associated with a user that owns, controls, and/or has access to the user devices. Each of the user devices shown in FIG. 1 may further include one or more biometric sensors (e.g. Sensor 125 in User Device 1 120, Sensor 145 in User Device 2 140, and Sensor 165 in User Device 3 160). The biometric sensor that may be included in each of the user devices may consist of or include a digital camera operable to capture image data (e.g. one or more images of the user's face, fingerprint, eye or eye region, palm, etc.), a microphone operable to capture a recording of the user's voice, and/or any other specific type of biometric sensor operable to capture biometric samples.

Those skilled in the art will recognize that while three user devices and one remote server are shown in the example of FIG. 1, the disclosed system is not limited to a configuration having any specific number of user devices and/or remote servers. Accordingly, the disclosed techniques may be applied to various specific configurations that include one or more remote servers and/or one or more user devices. Those skilled in the art will also recognize that while certain software constructs are specifically shown and described for purposes of explanation, the memory of each user device may additionally or alternatively include other software constructs, which are not shown, such as an operating system, various applications, and/or other processes.

During operation of the biometric system 50 shown in FIG. 1, the user may enroll with the biometric system 50 using one or more initial biometric samples captured by any specific one of the user devices, and advantageously is not required to enroll again when using any other one of the user devices to access a secure resource for which identity verification is required. After the user is enrolled through one of the user devices, the biometric system 50 may thereafter operate to verify the user's identity based on biometric samples that are subsequently captured by any one of the user devices and a reconstructed original biometric template, as further described below.

For example, during an enrollment process performed through User Device 1 120, at least one initial biometric sample for the user may be captured using the Biometric Sensor 125 of User Device 1 120. The Feature Extractor Logic 131 extracts biometric information from the initial sample to generate a biometric template that identifies the user, and that describes at least one distinct physiological or behavioral biometric characteristic of the user. Distinct physiological biometric characteristics represented by the biometric information extracted from the initial sample and stored in the biometric template generated for the user may include various distinct characteristics related to the user's body. Examples include, but are not limited to, distinct characteristics of the user's fingerprint, palm print, face, eye or eye region. Biometric information describing such distinct physiological characteristics may be extracted by Feature Extractor Logic 131 from an initial sample or samples that consist of one or more digital images captured from the user by way of an appropriate type of biometric sensor (e.g. Sensor 125), such as an image acquisition system including a digital camera or the like.

Examples of distinct behavioral biometric characteristics that may be represented by the biometric information extracted from the initial sample and stored in the biometric template generated for the user may additionally or alternatively include various distinct characteristics related to the user's behavior. Examples include but are not limited to distinct characteristics of the user's voice, typing rhythm, and/or gait. Such distinct behavioral characteristics may be extracted by Feature Extractor Logic 131 from an initial sample or samples consisting of one or more digital recordings of the user's voice, typing rhythm, and/or movement, and that are captured from the user by way of an appropriate type of biometric sensor (e.g. Sensor 125), such as a sound acquisition system including one or more microphones, and/or a video acquisition system including a digital video camera or the like.

The original biometric template generated by Feature Extractor Logic 131 is then passed to Template Splitting and Reconstruction Logic 130. Template Splitting and Reconstruction Logic 130 splits the original biometric template into multiple template shares using polynomial-based secret sharing techniques, such that at least a threshold number of the multiple template shares must be combined in order to reconstruct the original biometric template. The threshold number of the template shares that must be combined in order to reconstruct the original biometric template must be at least two. The splitting may further be performed such that the threshold number is calculated to be a value that is less than the total number of template shares resulting from the splitting.

For example, the disclosed system may be embodied such that the user's original biometric template is split using a polynomial-based (k, n) threshold technique in which the original biometric template is split into n template shares $TS_1, \ldots TS_n$ such that (i) possession of any k or more template shares is necessary to reconstruct the original biometric template, and (ii) the original biometric template cannot by determined based on k−1 or fewer of the template shares. An example of such a polynomial-based threshold technique is described in "How to Share a Secret" by Adi Shamir, Communications of the ACM, November 1979, Volume 22, Number 11, all disclosures of which are hereby included herein by reference. Alternatively, the original biometric template may be split with the additional feature that one of the resulting template shares is a special template share that must be one of the template shares in any combination of template shares used to reconstruct the original biometric template.

After the original biometric template is split, Template Splitting and Reconstruction Logic 130 distributes the resulting template shares to multiple components in the Biometric System 50. The components in Biometric System 50 to which the template shares are distributed may include a server-side component, such as Remote Server 100, and one or more of the user devices. In the example in which the user enrolls with Biometric System 50 through User Device 1 120, one of the template shares may be stored as a local share in User Device 1 120, shown in FIG. 1 by Template Share 132. Another one of the template shares may be transmitted from User Device 1 120 to Remote Server 100 for storage on Remote Server, shown in FIG. 1 as Template Share 112.

Additional template shares may be transmitted (e.g. from User Device 1 120) to one or more of the other user devices for storage, shown in FIG. 1 by Template Share 152 in User Device 2 140 and Template Share 172 in User Device 3 160.

The disclosed system may be configured or embodied such that Template Splitting and Reconstruction Logic 130 splits the original biometric template such that the total number of resulting template shares is equal to the number of user devices associated with the user, incremented by one. For example, the Template Splitting and Reconstruction Logic 130 may calculate a total number of template shares into which the original biometric template is to be split. The total number of template shares may be calculated i) as a value one greater than the total number of user devices that belong to the user, or ii) as a value one greater than the total number of user devices that the user is allowed to use. Policy and/or configuration settings indicating the total number of devices that belong to the user, and/or the total number of devices the user is allowed to use, may be stored in and obtained from either User Device 1 120 or the Remote Server 100.

The original biometric template may be split (e.g. by Template Splitting and Reconstruction Logic 130) such that any of the key shares may be combined to make up the threshold number of shares needed to reconstruct the biometric template. For example, in response to configuration settings stored in one or more of the user devices and/or on the remote server that indicate that identity verification is to be performed even when the user is using a user device that is not connected to the Internet, the original biometric template may be split such that any of the resulting key shares may be combined to reconstruct the biometric template. Alternatively, the biometric template may be split such that a particular one of the generated shares must be included in the combination of shares used to reconstruct the original biometric template. For example, in response to configuration settings stored in one or more of the user devices and/or on the remote server that indicate that identity verification is to be performed only when the user is using a user device that is connected to the Internet, the original biometric template may be split such that a particular one of the generated shares must be included in any combination of shares used to reconstruct the biometric template, and that one of the shares may be distributed to the Remote Server 100 for storage in Remote Server 100.

After splitting of the original biometric template and distribution of the resulting template shares, the original copy of the biometric template is destroyed (e.g. by Template Splitting and Reconstruction Logic 130). For example, any and all copies of the original biometric template may be deleted, e.g. from the device on which the original biometric template was generated, and/or from the device on which splitting of the original biometric template was performed.

After the template shares resulting from splitting of the original biometric template have been distributed and stored, and after the original biometric template has been destroyed, the disclosed system may subsequently perform an identity verification process to verify that a current user of a user device is the same person that is identified by the original biometric template (i.e. is the same person as the person that supplied the initial biometric samples that were used to generate the original biometric template). For example, in the case where an identity verification process is performed on User Device 1 120, Template Splitting and Reconstruction Logic 130 obtains and combines at least the threshold number of template shares necessary to reconstruct the user's biometric template. For example, in the case where the threshold number of template shares that must be used to reconstruct the original biometric template is two, Template Splitting and Reconstruction Logic 130 may obtain the template share of the user device (i.e. Template Share 132), as well as the template share of the Remote Server 100 (i.e. Template Share 112), and then uses the two obtained template shares to reconstruct the original biometric template.

The reconstructed biometric template may then be passed to Matcher Logic 128 for comparison with biometric information extracted from one or more subsequently collected biometric samples, in order to determine whether the user from which the subsequently collected biometric samples is the user associated with the original biometric template. For example, in order to compare the biometric data in the subsequently collected biometric sample or samples with the reconstructed original biometric template, the biometric data from the subsequently collected biometric sample or samples may be processed by Feature Extractor Logic 131 in order to extract the appropriate biometric information for comparison with the reconstructed original biometric. The biometric information extracted by Feature Extractor Logic 131 from the subsequently collected biometric sample or samples is then passed to Matcher Logic 128 for comparison with the reconstructed biometric template.

If Matcher Logic 128 determines that there is a match between the reconstructed biometric template and the biometric information extracted by Feature Extractor Logic 131 from the subsequently captured biometric sample(s), then Matcher Logic 128 outputs a result indicating that the identity of the user that provided the subsequently collected biometric samples is verified as being the same as the user associated with the original biometric template. Otherwise, in the case where Matcher Logic 128 determines that the reconstructed biometric template and the biometric information extracted by Feature Extractor Logic 131 do not match, then Matcher Logic 128 outputs a result indicating that the identity of the user that provided the subsequently collected biometric sample(s) is not verified as being the same as the identity of the user associated with the original biometric template. In the case where a user is requesting access to a protected service or resource to which access is only allowed for the user associated with the original biometric template, the access to the resource is only granted when the result output from Matcher 128 indicates that the identity of the user providing the subsequently collected biometric sample(s) has been verified as being the same as the identity of the user associated with the original biometric template.

The set of template shares that are obtained and used to reconstruct the original biometric template may include, as one of the template shares used to reconstruct the original biometric template, the local template share stored in the user device at which identity verification is performed (e.g. the user device through which access to a protected resource or service is being requested). The user device at which identity verification is performed may be different from the user device at which the user enrolled with the Biometric System 50 (the user device at which the initial biometric sample was captured from which biometric information was extracted to generate the original biometric template).

For example, when identity verification is performed at User Device 1 120, Template Splitting and Reconstruction Logic 130 may obtain and use Template Share 132 as one of the template shares used to reconstruct the original biometric template. Alternatively, when identity verification is performed at User Device 2 140, the template splitting and reconstruction logic of that device, e.g. Template Splitting and Reconstruction Logic 150, may obtain and use the local template share of that device, e.g. Template Share 152, as one of the template shares used to reconstruct the original biometric template. Similarly, when identity verification is performed at User Device 3 160, the template splitting and reconstruction logic of that device, e.g. Template Splitting and Reconstruction Logic 170, may obtain and use the local template share of that device, e.g. Template Share 172, as one of the template shares used to reconstruct the original biometric template.

Further during the identity verification process, one or more other template shares (besides the local template share) are obtained for inclusion in the set of template shares used to reconstruct the original biometric template. For example, when identity verification is performed at a user device, (e.g. User Device 1 120, User Device 2 140, or User Device 3 160), the template splitting and reconstruction logic on the user device may obtain a template share from a remote server, e.g. Template Share 112 from Remote Server 100, to be combined with the local template share stored on the user device in order to reconstruct the original biometric template. In another example, the template splitting and reconstruction logic of the user device may obtain one or more additional template shares from one or more other user devices, and then combine the template share(s) obtained from the other user device(s) with its locally stored template share in order to reconstruct the original biometric template.

Remote Server 100 is shown optionally including Template Splitting and Reconstruction Logic 110 and Matcher Logic 108. While the enrollment and identity validation processes performed in the embodiment of FIG. 1 may be performed by components of one of the user devices, the enrollment and identity verification processes described in the above example as being performed by Template Splitting and Reconstruction Logic 130 and Matcher Logic 128 in User Device 1 120 may alternatively be performed in the Remote Server 100 by the Template Splitting and Reconstruction Logic 110 and Matcher Logic 108. Accordingly, the disclosed system may be embodied such that a user device captures biometric samples through a sensor (e.g. Sensor 125), and generates a biometric template based on the those samples using a feature extractor (e.g. Feature Extractor Logic 131), and then uses a template splitting and reconstruction service provided by a remote server (e.g. by Remote Server 100) to perform template splitting and distribution during the enrollment process, as well as template reconstruction and matching of reconstructed biometric templates with biometric information extracted from subsequently captured biometric samples as part of an identity verification process. In this regard the Remote Server 100 may be embodied to include the Template Splitting and Reconstruction Logic 110 and Matcher Logic 108, which provide the same template splitting and reconstruction functionality as described above with reference to the Template Splitting and Reconstruction Logic 130 in User Device 1 120, and the same matching functionality as described above with reference to Matcher Logic 128 in User Device 1 120.

Figure 2:
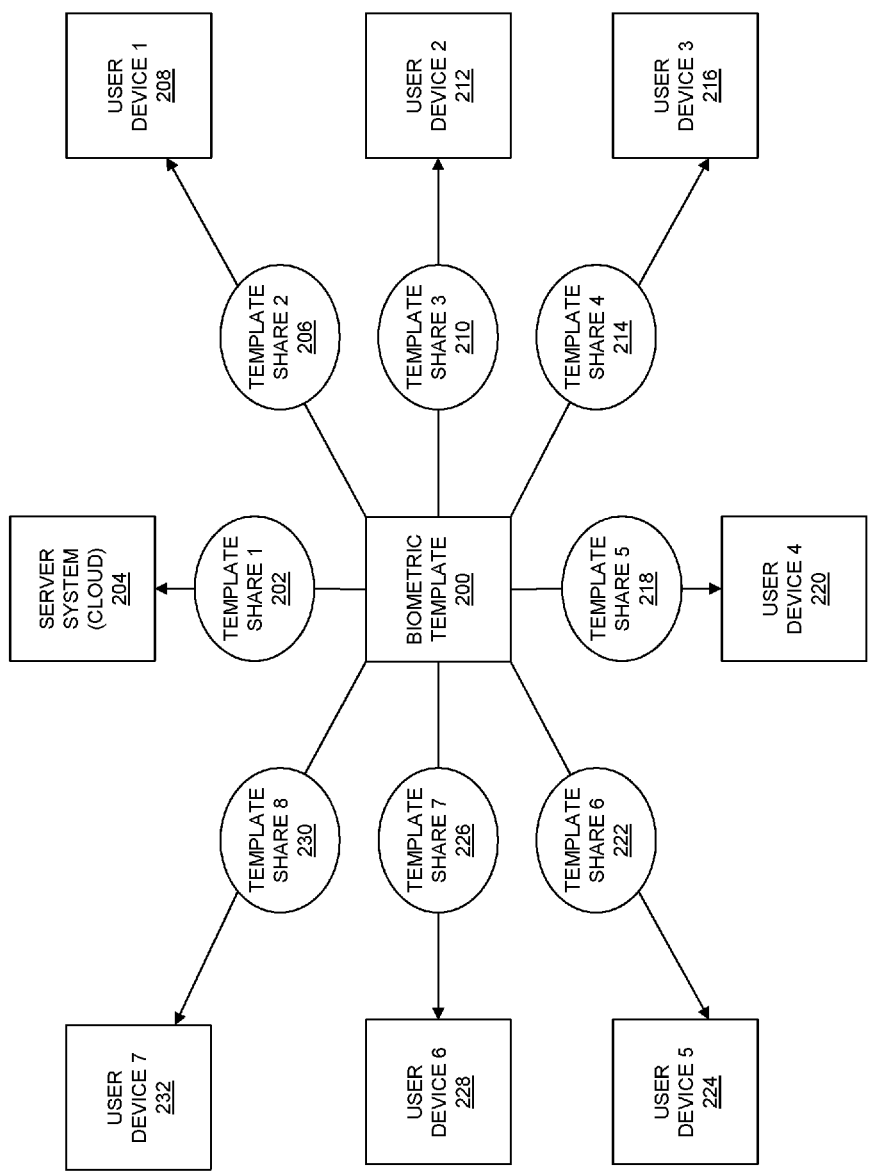
FIG. 2 is a block diagram showing an example of splitting a biometric template and distributing the resulting template shares in accordance with an embodiment of the disclosed system.

FIG. 2 is a block diagram showing an example of splitting and distribution of a biometric template in accordance with an embodiment of the disclosed system. The operations illustrated by the example of FIG. 2 may, for example, be performed by template splitting logic. Such template splitting logic may be embodied within a user device and/or within a remote server, as illustrated in FIG. 1 by Template Splitting and Reconstruction Logic 130 in User Device 1 120, Template Splitting and Reconstruction Logic 150 in User Device 2 140, Template Splitting and Reconstruction Logic 170 in User Device 3 160, and optional Template Splitting and Reconstruction Logic 110 in Remote Server 100.

In the example of FIG. 2, a Biometric Template 200 that describes at least one distinct physiological or behavioral characteristic of a user is split into template shares, shown by Template Share 1 202, Template Share 2 206, Template Share 3 210, Template Share 4 214, Template Share 5 218, Template Share 6 222, Template Share 7 226, and Template Share 8 230. The disclosed system calculates a total number of template shares that the Biometric Template 200 is split into that is equal to a total number of user devices that are associated with the user, plus one. The total number of user devices that are associated with the user may be calculated as a total number of user devices that currently belong to the user (e.g. that have been registered by the user with the biometric system), and/or as a total number of user devices that the user is allowed to use with the biometric system. The total number of devices that are associated with the user may be determined in response to policy and/or configuration settings.

In the example of FIG. 2, the user identified by Biometric Template 200 is associated with seven user devices, shown by User Device 1 208, User Device 2 212, User Device 3 216, User Device 4 220, User Device 5 224, User Device 6 228, and User Device 7 232. As shown in FIG. 2, the Biometric Template 200 is split into a total number of template shares that is one larger than the total number of user devices associated with the user identified by the Biometric Template 200, i.e. eight total template shares. Each one of the template shares resulting from the splitting of Biometric Template 200 is distributed to a separate individual component of the biometric system. Specifically, one template share is distributed to the Server System 204, which may be a cloud server, and each of the remaining template shares is distributed to an individual one of the user devices associated with the user identified by the Biometric Template 200.

Figure 3:
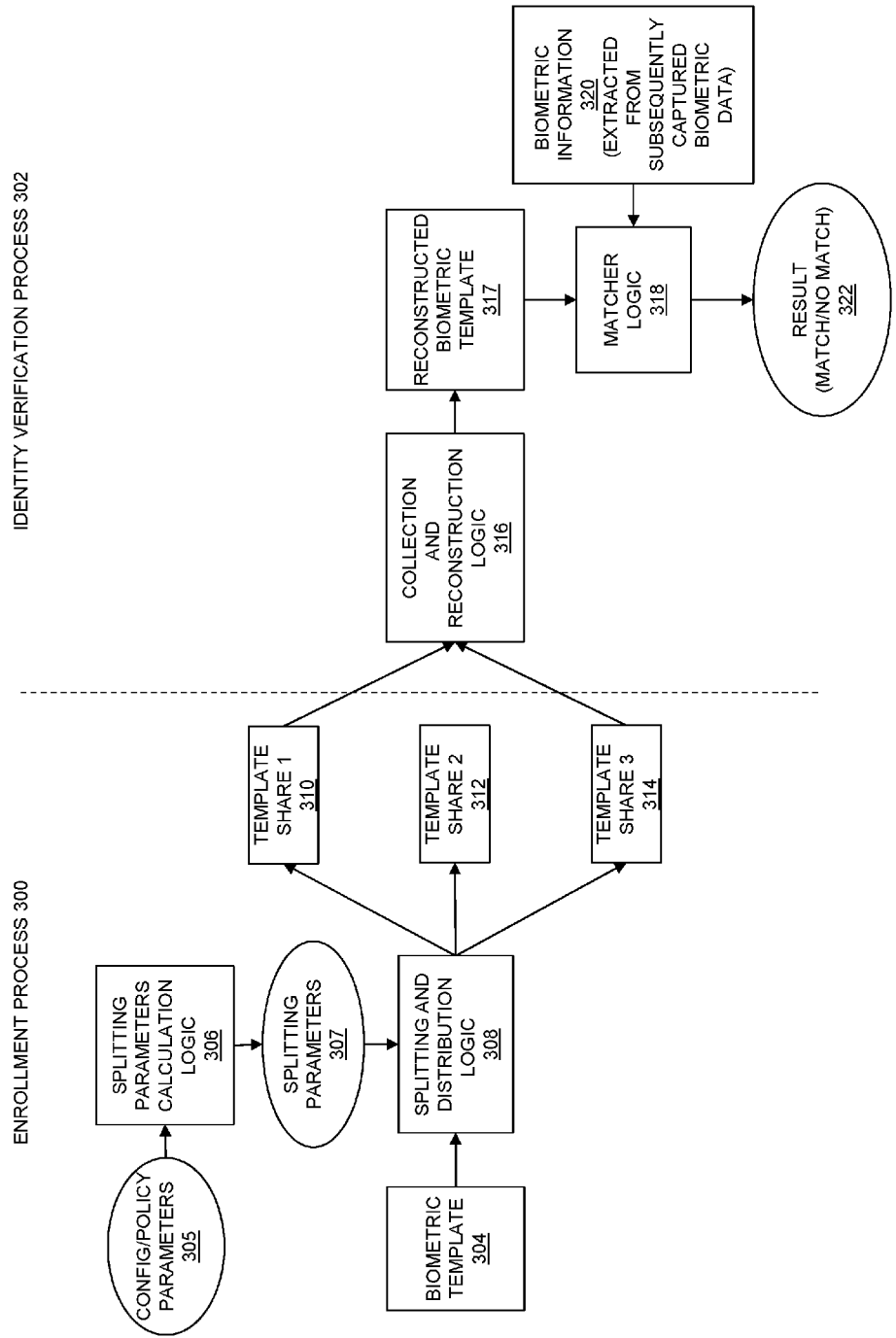
FIG. 3 is a block diagram further illustrating operation of an embodiment of the disclosed system.

FIG. 3 is a block diagram further illustrating operation of an embodiment of the disclosed system. As shown in FIG. 3, during an Enrollment Process 300, a Biometric Template 304 is passed to Splitting and Distribution Logic 308 to be split into template shares that are distributed to individual components in the biometric system. The Splitting and Distribution Logic 308 may, for example, be embodied within a user device (e.g. within the Template Splitting and Reconstruction Logic 130 shown in User Device 1 120), or in a remote server (e.g. in the optional Template Splitting and Reconstruction Logic 110 shown in Remote Server 100 in FIG. 1).

A set of Configuration and Policy Parameters 305 is input by Splitting Parameters Calculation Logic 306. Splitting Parameters Calculation Logic 306 may also, for example, be embodied within a user device (e.g. in the Template Splitting and Reconstruction Logic 130 shown in User Device 1 120), or within a remote server (e.g. in the optional Template Splitting and Reconstruction Logic 110 shown in Remote Server 100 in FIG. 1). Configuration and Policy Parameters 305 may be stored in a user device (e.g. in Memory 122 of Device 1 120) or in in a remote server (e.g. in Memory 102 of Remote Server 100). Configuration and Policy Parameters 305 may include indications of the total number of user devices associated with the user identified by Biometric Template 304 (e.g. the total number of user devices that belong to the user or that the user is permitted to use). Configuration and Policy Parameters 305 may further include an indication of whether a) user identity verification must be performed whenever a user attempts to use a user device that is associated with the user, or b) user identity verification must be performed only when a user attempts to use a user device associated with the user when the user device is connected to the internet. Configuration and Policy Parameters 305 may also include an indication of how many template shares must be combined in order to reconstruct Biometric Template 304 (i.e. the threshold number of template shares required for reconstruction).

In response to Configuration and Policy Parameters 305, Splitting Parameters Calculation Logic 306 calculates Splitting Parameters 307. Splitting Parameters 307 include an indication of the total number of template shares into which Biometric Template 304 is to be split. Splitting Parameters Calculation Logic 306 may calculate the total number of template shares into which Biometric Template 304 is to be split as the total number of user devices associated with the user plus one. Splitting Parameters 307 may further include an indication of the threshold number of template shares that must be obtained and combined in order to reconstruct Biometric Template 304.

Splitting Parameters 307 may also include an indication of whether Biometric Template 304 is to be split such that a particular one of the resulting template shares must be included in any set of template shares used to reconstruct Biometric Template 304, and is distributed to and stored by the remote server system (e.g. Remote Server 100). For example, an indication that a particular one of the resulting template shares must be included in any set of template shares used to reconstruct Biometric Template 304, and should be distributed to and stored by the remote server system (e.g. Remote Server 100), may be included in Splitting Parameters 307 in response to an indication in Configuration and Policy Parameters 305 that user identity verification must be performed only when a user attempts to use a user device when the user device is connected to the Internet.

In the example of FIG. 3, Splitting and Distribution Logic 308 splits Biometric Template 304 into three template shares, shown by Template Share 1 310, Template Share 2 312, and Template Share 3 314. Splitting and Distribution Logic 308 splits Biometric Template 304 such that at least two of the three template shares must be obtained and combined in order to reconstruct Biometric Template 304. The three template shares are then distributed to individual components within the biometric system, and the original Biometric Template 304 is destroyed.

Subsequently, the disclosed system performs Identity Verification Process 302, which may be performed by the same or a different device or devices with respect to the device or devices that performed Enrollment Process 300. During Identity Verification Process 302, the biometric system receives captured biometric data, and operates to verify whether the subsequently captured biometric data was captured from the user that is identified by the Biometric Template 304. The disclosed system extracts biometric information from the subsequently captured biometric data, e.g. using a feature extractor such as the Feature Extractor Logic 151 of Device 2 140 shown in FIG. 1. The disclosed system then passes the resulting Biometric Information 320 that was extracted from the subsequently captured biometric data to Matcher Logic 318. Matcher Logic 318 may, for example be embodied within a user device (e.g. Matcher Logic 148 in User Device 2 140 of FIG. 1), or within a remote server (e.g. optional Matcher Logic 108 in Remote Server 100 of FIG. 1). Further during the Identity Verification Process 302, Collection and Reconstruction Logic 316 obtains and combines a set of template shares equal to or greater than the threshold number of template shares required to reconstruct Biometric Template 304. Identity Verification Process 302 may be embodied within a user device (e.g. within Template Splitting and Reconstruction Logic 150 in User Device 2 140 of FIG. 1), or within a remote server (e.g. within optional Template Splitting and Reconstruction Logic 110 in Remote Server 100 of FIG. 1).

In the example of FIG. 3, the threshold number of template shares that must be obtained and combined to reconstruct Biometric Template 304 is two, and Collection and Reconstruction Logic 316 obtains Template Share 1 310 and Template Share 3 314 to generate Reconstructed Biometric Template 317. Reconstructed Biometric Template 317 is then passed to Matcher Logic 318. Matcher Logic 318 compares Reconstructed Biometric Template 317 to Biometric Information 320 and generates Result 322. If Biometric Information 320 matches Biometric Template 317, then Result 322 indicates that the subsequently captured biometric data from which Biometric Information 322 was extracted was captured from the user identified by the original Biometric Template 304. If Biometric Information 320 does not match Biometric Template 317, then Result 322 indicates that the subsequently captured biometric data from which Biometric Information 322 was extracted was not captured from the user identified by the original Biometric Template 304.

Figure 4:
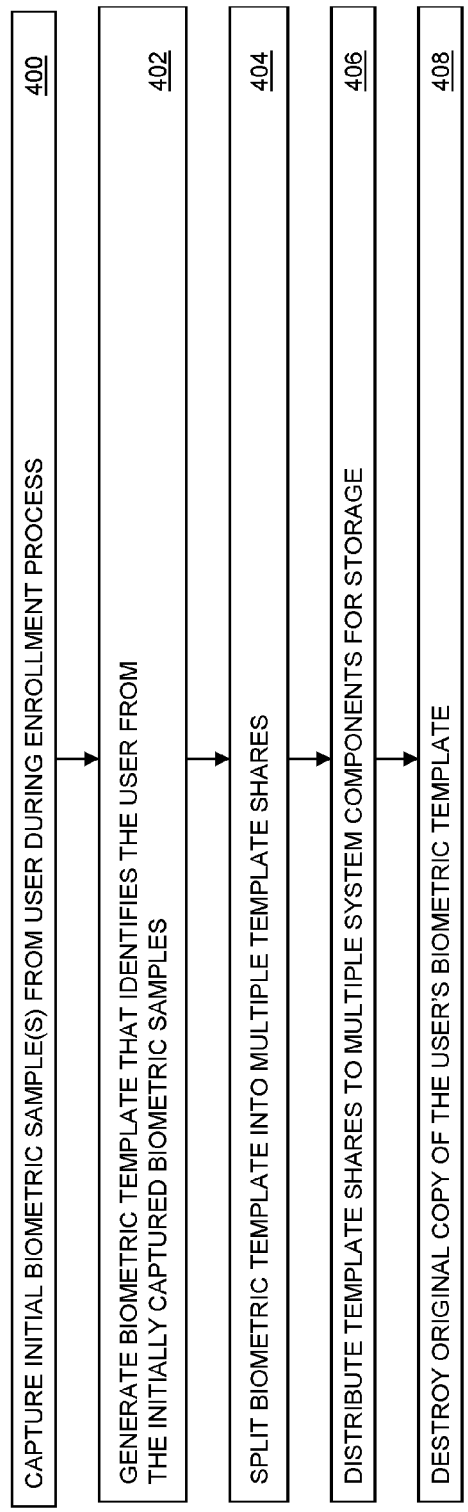
FIG. 4 is a flow chart showing steps performed during an enrollment process performed by an embodiment of the disclosed system.

FIG. 4 is a flow chart showing steps performed during an enrollment process performed by an embodiment of the disclosed system. At step 400, the disclosed system captures at least one initial user biometric sample, for example through a biometric sensor of a user device. At step 402, the disclosed system generates an original biometric template that identifies the user from which the initial biometric sample was captured at step 402. Generating the biometric template at step 402 may include pre-processing of the biometric data captured by the biometric sensor, such as removing artifacts introduced by the sensor, removing background noise, normalization, etc. The pre-processing may be followed by feature extraction, during which biometric information is extracted from the captured biometric data. The extracted biometric information consists of the specific features of the captured biometric data that will be used during subsequent comparison operations. The biometric template generated at step 402 is a digital representation of one or more distinct physiological and/or behavioral characteristics of the user from which the initial biometric sample was captured at step 402.

At step 404 the disclosed system splits the biometric template generated at step 402 into multiple template shares, using a polynomial-based secret sharing technique, in which the original biometric template is split into n template shares such that (i) any k or more template shares can be combined to reconstruct the original biometric template, and (ii) the original biometric template cannot by determined based on k−1 or fewer of the template shares. For example, at step 404 the disclosed system may split the biometric template into a total number of template shares equal to the total number of user devices that belong to the user plus one, and such that at least two of the template shares must be combined to reconstruct the original biometric template.

At step 406 the disclosed system distributes the individual template shares generated at step 404 to separate components of the biometric system for storage. For example, at step 406 the disclosed system may distribute a different one of the template shares to each one of multiple user devices associated with the user from which the initial biometric sample was captured, including the user device at which the initial biometric sample was captured. Another one of the template shares is distributed to a remote server for storage on the remote server.

At step 408, the disclosed system destroys the original copy of the biometric template and any remaining biometric data or information used during generation of the original copy of the biometric template. After step 408, the biometric template cannot be reconstructed without obtaining at least the threshold number of template shares, each of which has been distributed to and stored on a different one of the components in the biometric system.

Figure 5:
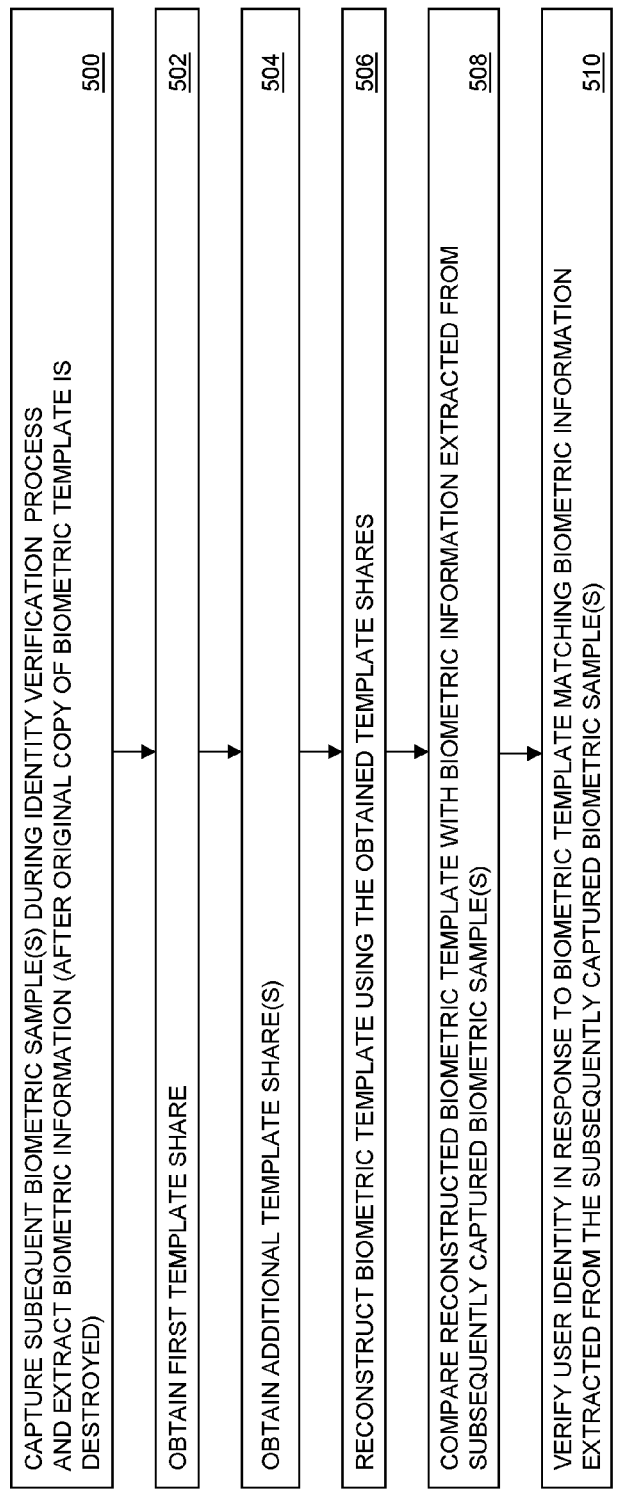
FIG. 5 is a flow chart showing steps performed during a user identity verification process performed by an embodiment of the disclosed system.

FIG. 5 is a flow chart showing steps performed during a user identity verification process performed by an embodiment of the disclosed system. The steps shown in FIG. 5 are performed subsequent to the enrollment process performed by the steps shown in FIG. 4. In the case where the steps of FIG. 5 are performed by a user device, they may be performed by the same user device the performed the steps of FIG. 4, or alternatively by a different user device than the user device that performed the steps of FIG. 4.

At step 500 the disclosed system captures at least one biometric sample, and extracts biometric information from the captured sample. The extraction of biometric information from the captured sample at step 500 may parallel the processing of the initial sample to generate the original biometric template (step 402 in FIG. 4). For example, at step 500 the disclosed system may pre-process of the biometric data captured by the biometric sensor at step 500, for example by removing artifacts introduced by the sensor, removing background noise, normalization, etc. Such pre-processing may be followed by feature extraction, during which the biometric information is extracted from the captured biometric data. As in the generation of the original biometric template, the biometric information extracted from the subsequently captured biometric sample consists of the specific features of the captured biometric data that will be used during subsequent comparison operations.

At step 502 the disclosed system begins obtaining template shares to reconstruct the original biometric template by obtaining a first one of the template shares from the local user device at which the biometric sample was captured at step 500. At step 504 the disclosed system obtains the additional template share or shares that are necessary to reconstruct the original biometric template. For example, in the case where two of the template shares are required to reconstruct the original biometric template, the Template Splitting and Reconstruction Logic 150 in Device 2 140 of FIG. 1 may operate to obtain its local Template Share 152 at step 502, and then at step 504 obtain Template Share 112 from Remote Server 100 at step 504. Alternatively, at step 504 Template Splitting and Reconstruction Logic 150 may obtain a second template share from another one of the user devices, e.g. Template Share 132 from User Device 1 120 or Template Share 172 from User Device 3 160.

At step 506, the disclosed system reconstructs the original biometric template using the template shares obtained in step 502 and 504. At step 508 the disclosed system compares the reconstructed biometric template with the biometric information extracted from the biometric data captured at step 500.

Based on the comparison performed at step 508, at step 510 the disclosed system verifies the identity of the user from whom the biometric samples were captured at step 500. If the biometric information extracted from the biometric sample captured at step 500 matches the reconstructed biometric template, then at step 510 the disclosed system generates an indication that the user from whom the biometric sample was captured at step 500 is the user identified by the original biometric template, i.e. is the user from whom the initial biometric sample was captured that was used to generate the original biometric template. Otherwise, if the biometric information extracted from the biometric sample captured at step 500 does not match the reconstructed biometric template, then at step 510 the disclosed system generates an indication that the user from whom the biometric sample was captured at step 500 is not the user identified by the original biometric template, i.e. is not the user from whom the initial biometric sample was captured that was used to generate the original biometric template.

Figure 6:
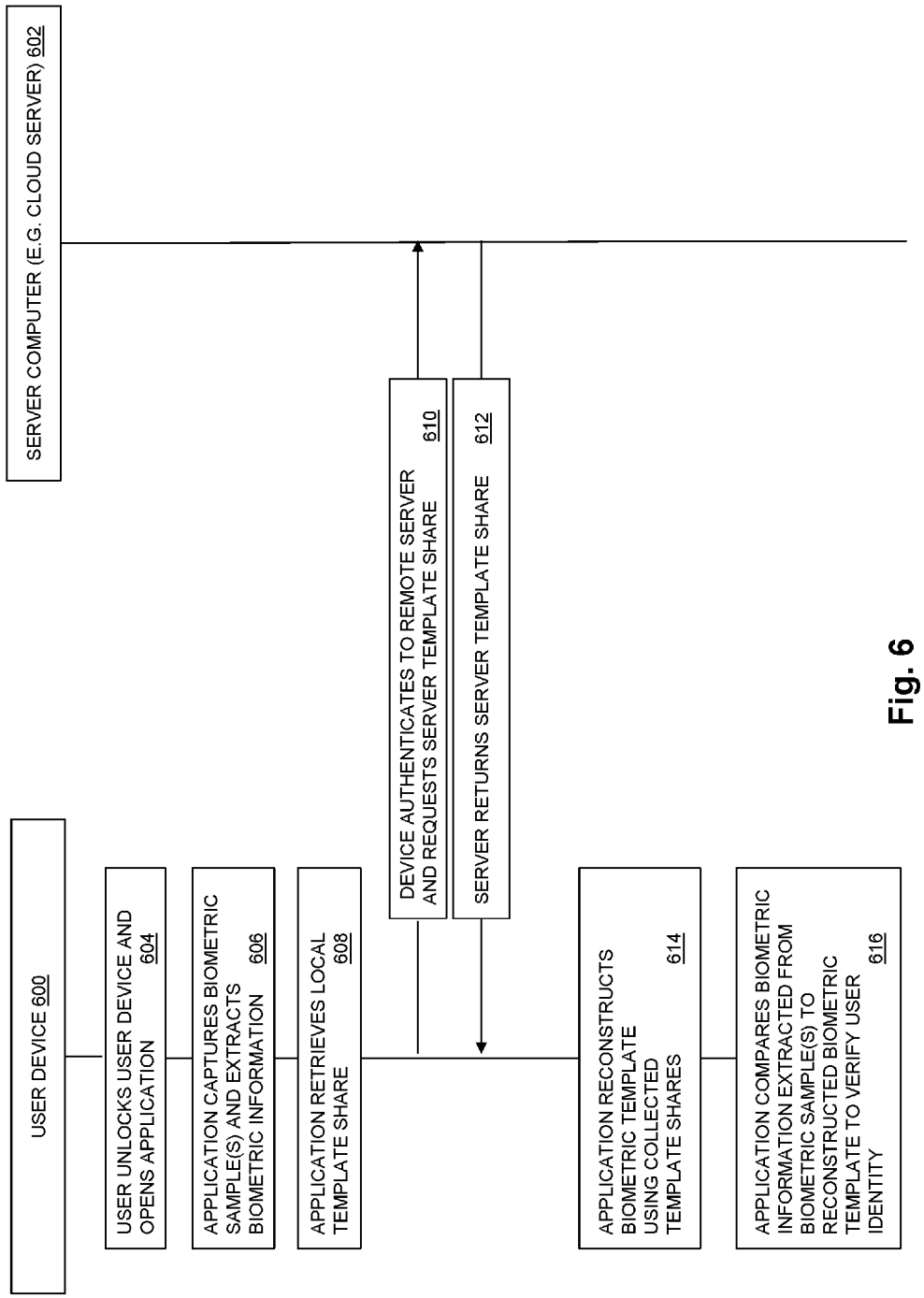
FIG. 6 is a sequence diagram showing how the disclosed system may operate to verify the identity of a user by obtaining and combining template shares stored in a local user device and a remote server.

FIG. 6 is a sequence diagram showing how the disclosed system may operate to verify the identity of a user by obtaining and combining template shares stored in a local user device and a remote server component. The operations shown in FIG. 6 are performed during a user identity verification process by a User Device 600, such as any one of the user devices shown in FIG. 1 (e.g. User Device 1 120), and a Server Computer 602 (e.g. Remote Server 100 in FIG. 1). The threshold number of template shares that must be combined to reconstruct the original biometric template in the example of FIG. 6 is two.

At 604 the user unlocks User Device 600 and opens an application on User Device 600. The application opened by the user may include program code such as the Template Splitting and Reconstruction Logic 130, Matcher Logic 128 and Feature Extractor Logic 131 shown in User Device 1 120 in FIG. 1.

At 606 the application causes at least one biometric sample to be captured from a current user of User Device 600, and extracts biometric information from the biometric sample. At 608 the application retrieves a local template share from User Device 600, such as for example Template Share 132 shown in User Device 1 120 in FIG. 1.

At 610 the User Device 600 authenticates to Server Computer 602, and application and/or User Device 600 requests the server template share from Server Computer 602. For example, the application may request a server template share such as Template Share 112 shown in Remote Server 100 in FIG. 1.

At 612, in response to successful authentication of User Device 600 to Server Computer 602 and the request for the server template share, the Server Computer 602 sends the server template share (e.g. Template Share 112 shown in FIG. 1) to User Device 600.

At 614 the application reconstructs the original biometric template using the template shares obtained from the User Device 600 and the Server Computer 602. At 616 the application compares the biometric information extracted from the biometric sample captured at 606 with the reconstructed biometric template. If there is a match between the extracted biometric information and the reconstructed biometric template, the identity of the current user of User Device 600 is verified to be the same as the user identified by the original biometric template, i.e. the current user of User Device 600 is verified to be the same as the user from whom the initial biometric sample was captured that was used to generate the original biometric template. As a result, the application may grant access through User Device 600 to one or more secure resources (e.g. Web sites, services, databases, files, etc.) to which the user identified by the original biometric template is allowed access.

Otherwise, if the biometric information extracted at 606 does not match the reconstructed biometric template, then at 616 the application determines that the current user of User Device 600 is not the same as the user identified by the original biometric template, i.e. the current user of User Device 600 is not the same as the user from whom the initial biometric sample was captured that was used to generate the original biometric template. As a result, the application may deny access through User Device 600 to one or more secure resources (e.g. Web sites, services, databases, files, etc.) to which the user identified by the original biometric template is allowed access, since the current user of User Device 600 has not been verified as being the user identified by the original biometric template.

Figure 7:
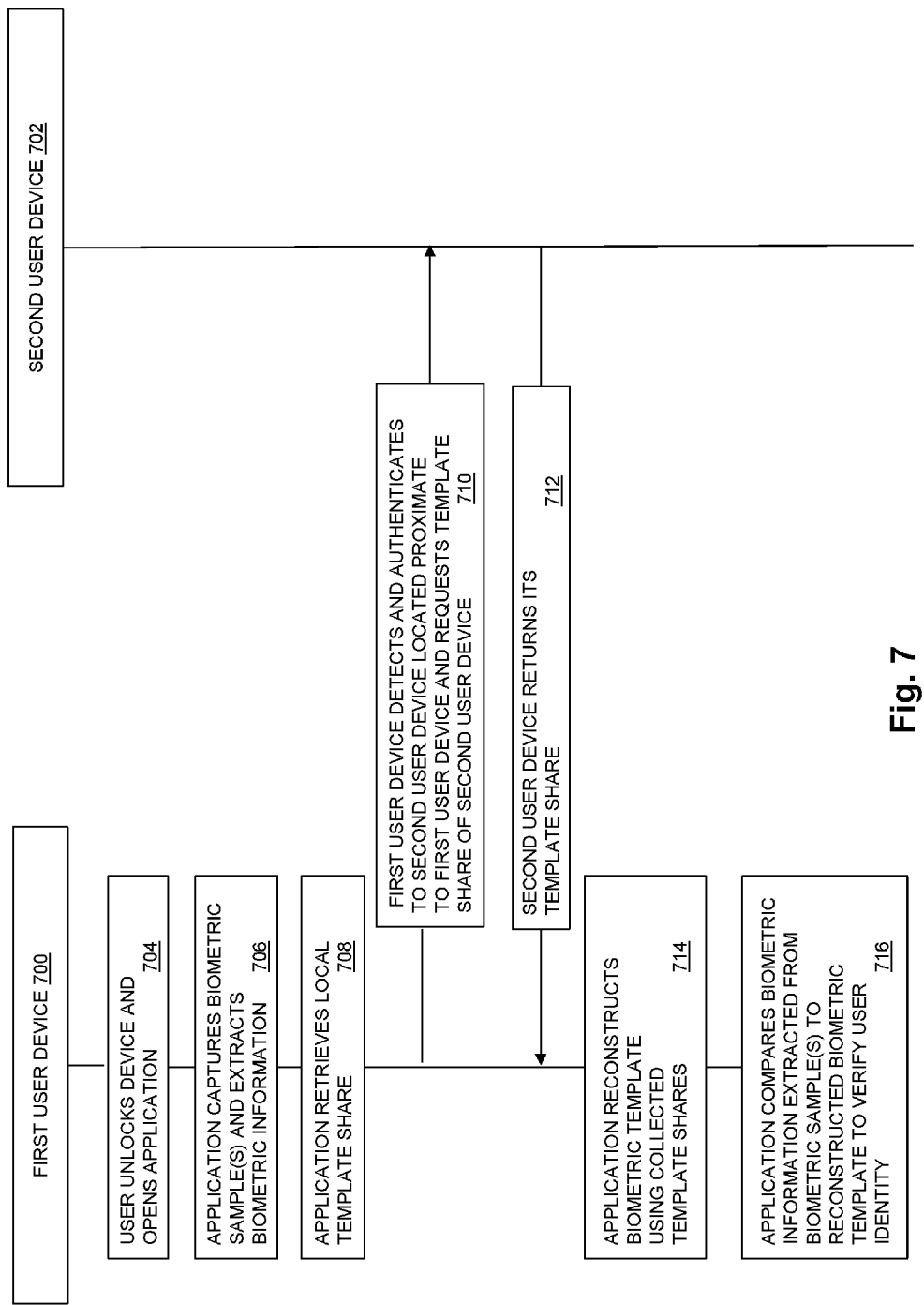
FIG. 7 is a sequence diagram showing how the disclosed system may operate to verify the identity of a user by obtaining and combining template shares stored in a first local user device and a second local user device.

FIG. 7 is a sequence diagram showing how the disclosed system may operate to verify the identity of a user by obtaining and combining template shares stored in a first local user device and a second local user device. The operations shown in FIG. 7 are performed during a user identity verification process by a First User Device 700, such as any one of the user devices shown in FIG. 1 (e.g. User Device 1 120), and another one of the user devices in FIG. 1, shown as Second User Device 702 (e.g. User Device 2 140). The threshold number of template shares that must be combined to reconstruct the original biometric template in the example of FIG. 7 is two.

At 704 the user unlocks First User Device 700 and opens an application on User Device 700. The application opened by the user may include program code such as the Template Splitting and Reconstruction Logic 130, Matcher Logic 128 and Feature Extractor Logic 131 shown in User Device 1 120 in FIG. 1.

At 706 the application causes at least one biometric sample to be captured from a current user of User Device 700, and extracts biometric information from the biometric sample. At 708 the application retrieves a local template share from User Device 700, such as for example Template Share 132 shown in User Device 1 120 in FIG. 1.

At 710 the First User Device 700 detects and authenticates to Second User Device 702. For example, First User Device 700 may detect Second User Device 702 on a local area network or the like to which First User Device 700 is also connected. Further at 710, the application and/or User Device 700 requests the user template share from Second User Device 702. For example, the application may request a user device template share such as Template Share 152 shown in User Device 2 140 in FIG. 1.

At 712, in response to successful authentication of First User Device 700 to Second User Device 702 and the request for the user device template share, the Second User Device 702 sends it's template share (e.g. Template Share 152 shown in FIG. 1) to the First User Device 700.

At 714 the application reconstructs the original biometric template using the template shares obtained from the First User Device 700 and the Second User Device 702. At 716 the application compares the biometric information extracted from the biometric sample captured at 706 with the reconstructed biometric template. If there is a match between the extracted biometric information and the reconstructed biometric template, the identity of the current user of First User Device 700 is verified to be the same as the user identified by the original biometric template, i.e. the current user of First User Device 700 is verified to be the same as the user from whom the initial biometric sample was captured that was used to generate the original biometric template. As a result, the application may grant access through First User Device 700 to one or more secure resources (e.g. Web sites, services, databases, files, etc.) to which the user identified by the original biometric template is allowed access.

Otherwise, if the biometric information extracted at 706 does not match the reconstructed biometric template, then at 716 the application determines that the current user of First User Device 700 is not the same as the user identified by the original biometric template, i.e. the current user of First User Device 700 is not the same as the user from whom the initial biometric sample was captured that was used to generate the original biometric template. As a result, the application may deny access through First User Device 700 to one or more secure resources (e.g. Web sites, services, databases, files, etc.) to which the user identified by the original biometric template is allowed access, since the current user of First User Device 700 has not been verified as being the user identified by the original biometric template.

While the techniques shown in FIG. 6 and FIG. 7 and explained above may, for example, be used to support verifying a user's identity during user login to an application on a user device, the disclosed techniques are not limited to use in that specific context. Accordingly, those skilled in the art will recognize that the same techniques shown in FIG. 6 and FIG. 7 and explained above may be applied in various other contexts, including but not limited to user identity verification while unlocking the user device itself (e.g. unlocking User Device 600 in FIG. 6 or unlocking First User Device 700 in FIG. 7).

Figure 8:
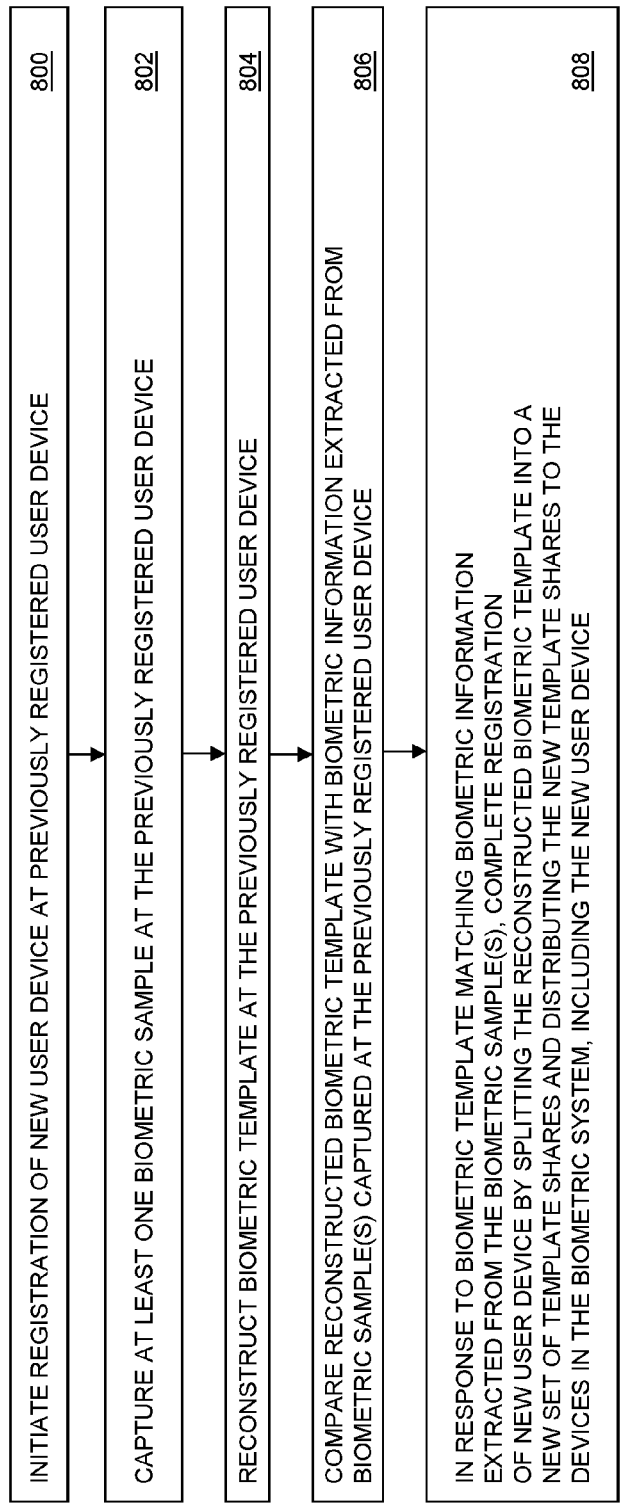
FIG. 8 is a flow chart showing steps performed to add a new device to the set of user devices associated with a user.

FIG. 8 is a flow chart showing steps performed to add a new device to the set of user devices associated with a user. Advantageously, and as shown in FIG. 8 and described below, a new device may be added to the set of user devices associated with a user without requiring the user to re-enroll with the biometric system, i.e. by reconstructing a biometric template generated during a previous enrollment of the user.

At step 800, the user initiates registration of a new device into the set of user devices associated with the user. For example, registration of a new device may include adding the network address and/or other information identifying the new device to a registry of user devices associated with the user. A copy of the registry may be stored in each device associated with the user, and/or on the remote server. Such a registry of user devices may, for example, include network address and/or other identifying information for each user device associated with the user, and enable communications with and/or between the set of devices associated with the user, for example during the distribution of template shares after splitting the user's biometric template, and/or when obtaining template shares to reconstruct the user's biometric template. Adding information that identifies the new user device to the registry may, for example, be performed as a result of the user initiating a registration operation with regard to the new device at step 800, on a user device that was previously registered as associated with the user (e.g. on a user device for which identifying information has already been stored in the registry). For example, initiating the registration of the new user device may include the user entering the identifying information for the new device to the previously registered user device, for example through a graphical user interface of the previously registered device, or using some other technique for providing the identifying information for the new device to the previously registered device.

In one embodiment, registration of the new user device requires that the identity of the user be verified at the previously registered device in order to complete the registration, i.e. before adding the new user device to the set of devices associated with the user. Accordingly, in order to verify the identity of the user, at step 802 the previously registered user device captures at least one biometric sample, and extracts biometric information from the captured sample. At step 804 the previously registered user device reconstructs the original biometric template using the number of template shares needed to reconstruct the original biometric template, for example by obtaining a first one of the template shares stored on the previously registered user device, and combining that template share with one or more additional template shares obtained from another previously registered user device, and/or from a remote server.

At step 806 the previously registered user device compares the reconstructed biometric template with biometric information extracted from the biometric data captured at the previously registered device (i.e. at step 802).

At step 808, in response to the reconstructed biometric template matching the biometric information extracted from the biometric sample(s) captured at the previously registered user device, registration is completed by updating the registry of user devices associated with the user by adding the information identifying the new device to the registry of user devices associated with the user, splitting the reconstructed biometric template into a new set of template shares, and distributing, at least partly based on the updated contents of the registry of user devices associated with the user, individual ones of the new template shares to individual devices in the distributed biometric system, wherein the distributing includes distributing one of the new template shares to the new user device. As a result, each one of the user's devices, including the newly registered user device, stores a unique one of the new template shares generated by the splitting of the reconstructed biometric template performed at step 808. Alternatively, in response to the result of comparing the biometric information to the reconstructed biometric template indicating that the biometric information does not match the reconstructed biometric template, registration of the new user device is denied, and information identifying the new device is not added to the registry of user devices associated with the user, and the reconstructed biometric template is discarded without being split into a new set of template shares.

While the above description provides examples of embodiments using various specific terms to indicate specific systems, devices, and/or components, such terms are illustrative only, and are used only for purposes of convenience and concise explanation. The disclosed system is not limited to embodiments including or involving systems, devices and/or components identified by the terms used above.

As will be appreciated by one skilled in the art, aspects of the technologies disclosed herein may be embodied as a system, method or computer program product. Accordingly, each specific aspect of the present disclosure may be embodied using hardware, software (including firmware, resident software, micro-code, etc.) or a combination of software and hardware. Furthermore, aspects of the technologies disclosed herein may take the form of a computer program product embodied in one or more non-transitory computer readable storage medium(s) having computer readable program code stored thereon for causing a processor and/or computer system to carry out those aspects of the present disclosure.

Any combination of one or more computer readable storage medium(s) may be utilized. The computer readable storage medium may be, for example, but not limited to, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any non-transitory tangible medium that can contain, or store a program for use by or in connection with an instruction execution system, apparatus, or device.

The figures include block diagram and flowchart illustrations of methods, apparatus(s) and computer program products according to one or more embodiments of the invention. It will be understood that each block in such figures, and combinations of these blocks, can be implemented by computer program instructions. These computer program instructions may be executed on processing circuitry to form specialized hardware. These computer program instructions may further be loaded onto a computer or other programmable data processing apparatus to produce a machine, such that the instructions which execute on the computer or other programmable data processing apparatus create means for implementing the functions specified in the block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the block or blocks.

Those skilled in the art should also readily appreciate that programs defining the functions of the present invention can be delivered to a computer in many forms; including, but not limited to: (a) information permanently stored on non-writable storage media (e.g. read only memory devices within a computer such as ROM or CD-ROM disks readable by a computer I/O attachment); or (b) information alterably stored on writable storage media (e.g. floppy disks and hard drives).

While the invention is described through the above exemplary embodiments, it will be understood by those of ordinary skill in the art that modification to and variation of the illustrated embodiments may be made without departing from the inventive concepts herein disclosed.

What is claimed is:

1. A computer-implemented method of protecting biometric templates in a distributed biometric system including a plurality of separate devices, wherein the devices in the distributed biometric system include a plurality of user devices associated with a user and a remote server, comprising executing, on at least one processor, the steps of:
   generating an original biometric template that identifies the user, wherein the original biometric template includes biometric information that describes at least one distinct characteristic of the user, and wherein the biometric information in the biometric template is extracted from at least one initial sample of biometric data captured from the user by at least one biometric sensor;
   calculating a total number of the user devices associated with the user;
   splitting the original biometric template into multiple template shares using polynomial-based secret sharing, wherein at least a threshold number of the multiple template shares must be combined in order to reconstruct the original biometric template, and wherein the threshold number is at least two, wherein splitting the original biometric template into multiple template shares is responsive to the total number of the user devices associated with the user, and wherein the splitting splits the original biometric template into a total number of template shares equal to one more than the total number of user devices associated with the user;
   distributing individual ones of the template shares to individual devices in the distributed biometric system, wherein each device in the distributed biometric system receives and stores only one of the template shares;
   destroying the original biometric template;
   wherein a registry of user devices associated with the user stores identification information for each of the plurality of user devices associated with the user; and
   adding a new user device to the plurality of user devices associated with the user at least in part by:
      capturing a biometric sample at a previously registered one of the plurality of user devices associated with the user,
      generating a reconstructed biometric template on the previously registered one of the plurality of user devices associated with the user,
      comparing the reconstructed biometric template with biometric information extracted from the biometric sample captured at the previously registered one of the plurality of user devices associated with the user, and
      in response to the reconstructed biometric template matching the biometric information extracted from the biometric sample captured at the previously registered one of the plurality of user devices associated with the user, i) updating the registry by storing identification information for the new user device into the registry, ii) splitting the reconstructed biometric template into a plurality of new template shares, and iii) distributing, responsive at least in part to the updated registry, individual ones of the new template shares to individual devices in the distributed biometric system, wherein the distributing includes distributing one of the new template shares to the new user device.

2. The method of claim 1, wherein a first user device in the plurality of user devices associated with the user includes the at least one biometric sensor; and wherein distributing individual ones of the template shares includes storing a first one of the template shares on the first user device and storing a second one of the template shares on the remote server.

3. The method of claim 2, wherein splitting the original biometric template into multiple template shares and distributing individual ones of the template shares are performed by the first user device; and wherein distributing individual ones of the template shares includes storing the first one of the template shares in the first user device and transmitting the second one of the template shares from the first user device to the remote server.

4. The method of claim 2, wherein splitting the original biometric template into multiple template shares and distributing individual ones of the template shares are performed by the remote server; and wherein distributing individual ones of the template shares includes storing the first one of the template shares in the remote server and transmitting the second one of the template shares from the remote server to the first user device.

5. The method of claim 1, wherein the total number of user devices associated with the user comprises a total number of user devices that belong to the user; and wherein splitting the original biometric template into multiple template shares is responsive to the total number of the user devices that belong to the user, and wherein the splitting splits the original biometric template into a total number different template shares equal to one more than the total number of user devices that belong to the user.

6. The method of claim 1, wherein the total number of user devices associated with the user comprises a total number of user devices that the user is permitted to use; and wherein splitting the original biometric template into multiple template shares is responsive to the total number of the user devices the user is permitted to use, and wherein the splitting splits the original biometric template into a total number different template shares equal to one more than the total number of user devices the user is permitted to use.

7. The method of claim 1, further comprising:

performing an identity verification process subsequent to destroying the original biometric template by i) capturing at least one subsequent biometric sample, ii) extracting biometric information from the subsequent biometric sample, iii) obtaining a set of template shares to be used to reconstruct the original biometric template, wherein the number of template shares in the obtained set is at least the threshold number of template shares that must be combined in order to reconstruct the original biometric template, iv) generating a reconstructed biometric template using the obtained set of template shares, v) comparing the reconstructed biometric template to the biometric information extracted from the subsequent biometric samples, and vi) in response to the biometric information extracted from the subsequent user biometric samples matching the reconstructed biometric template, verifying that the subsequent biometric sample was captured from the user identified by the original biometric template.

8. The method of claim 7, wherein the biometric information included in the original biometric template describes at least one distinct physiological characteristic of the user; and wherein the biometric information included in the original biometric template is extracted from at least one initial sample of biometric data that includes image data captured from the user by a biometric sensor comprising a digital camera.

9. The method of claim 8, wherein splitting the original biometric template into multiple shares includes generating a required one of the multiple template shares that must be one of the template shares in the set of template shares to be used to reconstruct the original biometric template;

wherein distributing individual ones of the template shares includes storing the required one of the multiple template shares in the remote server; and wherein obtaining the set of template shares to be used to reconstruct the original biometric template includes retrieving the required one of the multiple template shares from the remote server.

10. A device, comprising:

memory; and processing circuitry coupled to the memory, the memory storing program code for protecting biometric templates in a distributed biometric system including a plurality of separate devices, wherein the devices in the distributed biometric system include a plurality of user devices associated with a user and a remote server, wherein the distributed biometric system includes a registry of user devices associated with the user that stores identification information for each of the plurality of user devices associated with the user, and wherein the program code, when executed by the processing circuitry, causes the processing circuitry to:

generate an original biometric template that identifies the user, wherein the original biometric template includes biometric information that describes at least one distinct characteristic of the user, and wherein the biometric information in the biometric template is extracted from at least one initial sample of biometric data captured from the user by at least one biometric sensor, calculate a total number of the user devices associated with the user, split the original biometric template into multiple template shares using polynomial-based secret sharing, wherein at least a threshold number of the multiple template shares must be combined in order to reconstruct the original biometric template, and wherein the threshold number is at least two, wherein the original biometric template is split into multiple template shares responsive to the total number of the user devices associated with the user, and wherein the original biometric template is split into a total number of template shares equal to one more than the total number of user devices associated with the user, distribute individual ones of the template shares to individual devices in the distributed biometric system, wherein each device in the distributed biometric system receives and stores only one of the template shares, destroy the original biometric template, and
add a new user device to the plurality of user devices associated with the user at least in part by causing the processing circuitry to:
generate a reconstructed biometric template,
compare the reconstructed biometric template with biometric information extracted from a biometric sample captured at a previously registered one of the plurality of user devices associated with the user, and
in response to the reconstructed biometric template matching the biometric information extracted from the biometric sample captured at the previously registered one of the plurality of user devices associated with the user, i) update the registry by storing identification information for the new user device into the registry, ii) split the reconstructed biometric template into a plurality of new template shares, and iii) distribute, responsive at least in part to the updated registry, individual ones of the new template shares to individual devices in the distributed biometric system, wherein the distributing includes distributing one of the new template shares to the new user device.

11. The device of claim 10, wherein a first user device in the plurality of user devices associated with the user includes the at least one biometric sensor; and
wherein the program code, when executed by the processing circuitry, causes the processing circuitry to distribute individual ones of the template shares by distributing a first one of the template shares to the first user device and distributing a second one of the template shares to the remote server.

12. The device of claim 11, wherein the device comprises the first user device; and
wherein the program code, when executed by the processing circuitry, causes the processing circuitry to distribute individual ones of the template shares by storing the first one of the template shares in the first user device and transmitting the second one of the template shares from the first user device to the remote server.

13. The device of claim 11, wherein the device comprises the remote server; and
wherein distributing individual ones of the template shares includes storing the first one of the template shares in the remote server and transmitting the second one of the template shares from the remote server to the first user device.

14. The device of claim 10, wherein the total number of user devices associated with the user comprises a total number of user devices that belong to the user; and
wherein the program code, when executed by the processing circuitry, causes the processing circuitry to split the original biometric template into a total number of different template shares that is equal to one more than the total number of user devices that belong to the user.

15. The device of claim 10, wherein the total number of user devices associated with the user comprises a total number of user devices that the user is permitted to use; and
wherein the program code, when executed by the processing circuitry, causes the processing circuitry to split the original biometric template into a total number of different template shares that is equal to one more than the total number of user devices that the user is permitted to use.

16. The device of claim 10, wherein the program code, when executed by the processing circuitry, further causes the processing circuitry to perform an identity verification process subsequent to destroying the original biometric template by:
capturing at least one subsequent biometric sample;
extracting biometric information from the subsequent biometric sample;
obtaining a set of template shares to be used to reconstruct the original biometric template, wherein the number of template shares in the obtained set is at least the threshold number of template shares that must be combined in order to reconstruct the original biometric template;
generating a reconstructed biometric template using the obtained set of template shares;
comparing the reconstructed biometric template to the biometric information extracted from the subsequent biometric samples; and
in response to the biometric information extracted from the subsequent user biometric samples matching the reconstructed biometric template, verifying that the subsequent biometric sample was captured from the user identified by the original biometric template.

17. The device of claim 16, wherein the biometric information included in the original biometric template describes at least one distinct physiological characteristic of the user; and
wherein the biometric information included in the original biometric template is extracted from at least one initial sample of biometric data that includes image data captured from the user by a biometric sensor comprising a digital camera.

18. The device of claim 17, wherein the program code, when executed by the processing circuitry, further causes the processing circuitry to:
split the original biometric template into multiple shares by, at least in part, generating a required one of the multiple template shares that must be one of the template shares in the set of template shares to be used to reconstruct the original biometric template;
distribute individual ones of the template shares by, at least in part, storing the required one of the multiple template shares in the remote server; and
obtaining the set of template shares to be used to reconstruct the original biometric template by, at least in part, retrieving the required one of the multiple template shares from the remote server.

19. A computer program product having a non-transitory computer readable medium which stores a set of instructions operable to protect biometric templates in a distributed biometric system including a plurality of separate devices, wherein the devices in the distributed biometric system include a plurality of user devices associated with a user and a remote server, wherein the distributed biometric system includes a registry of user devices associated with the user that stores identification information for each of the plurality of user devices associated with the user, and wherein the set of instructions, when executed by processing circuitry, causes the processing circuitry to:
generate an original biometric template that identifies the user, wherein the original biometric template includes biometric information that describes at least one distinct characteristic of the user, and wherein the biometric information in the biometric template is extracted from at least one initial sample of biometric data captured from the user by at least one biometric sensor, calculate a total number of the user devices associated with the user, split the original biometric template into multiple template shares using polynomial-based secret sharing, wherein at least a threshold number of the multiple template shares must be combined in order to reconstruct the original biometric template, and wherein the threshold number is at least two, wherein the original biometric template is split into multiple template shares responsive to the total number of the user devices associated with the user, and wherein the original biometric template is split into a total number of template shares equal to one more than the total number of user devices associated with the user, distribute individual ones of the template shares to individual devices in the distributed biometric system, wherein each device in the distributed biometric system receives and stores only one of the template shares, destroy the original biometric template, and add a new user device to the plurality of user devices associated with the user at least in part by causing the processing circuitry to:

generate a reconstructed biometric template, compare the reconstructed biometric template with biometric information extracted from a biometric sample captured at a previously registered one of the plurality of user devices associated with the user, and in response to the reconstructed biometric template matching the biometric information extracted from the biometric sample captured at the previously registered one of the plurality of user devices associated with the user, i) update the registry by storing identification information for the new user device into the registry, ii) split the reconstructed biometric template into a plurality of new template shares, and iii) distribute, responsive at least in part to the updated registry, individual ones of the new template shares to individual devices in the distributed biometric system, wherein the distributing includes distributing one of the new template shares to the new user device.

* * * * *